United States Patent
Kubota et al.

(10) Patent No.: US 10,753,411 B2
(45) Date of Patent: Aug. 25, 2020

(54) VEHICLE CONTROL DEVICE

(71) Applicant: HONDA MOTOR CO., LTD., Tokyo (JP)

(72) Inventors: Eri Kubota, Saitama (JP); Masayuki Sadakiyo, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/367,569

(22) Filed: Mar. 28, 2019

(65) Prior Publication Data

US 2019/0301601 A1   Oct. 3, 2019

(30) Foreign Application Priority Data

Mar. 30, 2018   (JP) ................... 2018-068262

(51) Int. Cl.
*F16D 48/06*   (2006.01)

(52) U.S. Cl.
CPC ...... *F16D 48/06* (2013.01); *F16D 2500/1045* (2013.01); *F16D 2500/10412* (2013.01); *F16D 2500/30402* (2013.01); *F16D 2500/30408* (2013.01); *F16D 2500/30425* (2013.01); *F16D 2500/50251* (2013.01); *F16D 2500/50275* (2013.01); *F16D 2500/70605* (2013.01)

(58) Field of Classification Search
CPC ........... F16D 48/06; F16D 2500/70605; F16D 2500/50251–50263; F16D 2500/50275; F16D 2500/30402; F16D 2500/1045
See application file for complete search history.

(56) References Cited

U.S. PATENT DOCUMENTS

| 5,403,250 | A | * | 4/1995 | Juergens | ............... | F16D 48/066 |
|---|---|---|---|---|---|---|
| | | | | | | 477/174 |
| 9,869,354 | B2 | * | 1/2018 | Lee | ......... | F16D 48/02 |
| 2019/0162251 | A1 | * | 5/2019 | Kim | ......... | F16D 48/06 |

FOREIGN PATENT DOCUMENTS

| DE | 102016215597 A1 * | 2/2018 | ............. F16D 48/06 |
|---|---|---|---|
| JP | 2015-083860 A | 4/2015 | |

* cited by examiner

*Primary Examiner* — Erin D Bishop
(74) *Attorney, Agent, or Firm* — Paratus Law Group, PLLC

(57) ABSTRACT

A vehicle control device includes: a unit that acquires a first transmission torque transmitted in a first state in which a control pressure is controlled to a first pressure value, and a second transmission torque transmitted in a second state in which the control pressure is controlled to a second pressure value; a control unit including a storage unit that stores control data including data indicating a relationship between a friction coefficient and a surface pressure. The control unit calculates a first friction coefficient based on the data and the first pressure value, calculates a second friction coefficient based on the data and the second pressure value, calculates an estimated value of the touch point pressure based on the first and second pressure values, the first and second transmission torques, the first and second friction coefficients to control data based on the estimated value.

6 Claims, 3 Drawing Sheets

VEHICLE CONTROL DEVICE

CROSS-REFERENCE TO RELATED APPLICATIONS

This application is based on and claims priority under 35 USC 119 from Japanese Patent Application No. 2018-068262 filed on Mar. 30, 2018, the contents of which are incorporated herein by reference.

TECHNICAL FIELD

The present invention relates to a vehicle control device having a hydraulic power transmission mechanism interposed between a driving force source and driving wheels and controlling transmission of a driving force from the driving force source to the driving wheels by using a frictional force.

BACKGROUND ART

Physical characteristics, such as a friction coefficient, of a clutch as a power transmission mechanism interposed between a driving force source and driving wheels change due to a change with time.

Patent Literature 1 (Japanese Patent Application Laid-Open Publication No. 2015-83860) discloses a method in which an estimated friction coefficient of a friction material of a clutch is calculated based on a clutch pressing force and input torque input to the clutch, a difference between the estimated friction coefficient and a predetermined friction coefficient of the friction material is calculated and stored as a learning value, and the engagement pressure to be applied to the clutch is corrected using this learning value.

In Patent Literature 1, the engagement pressure is corrected only in consideration of a change with time in the friction coefficient of the clutch. However, due to a change with time in an internal return spring, the minimum control pressure for the clutch required to make the torque capacity larger than zero (to start torque transmission) also changes. Therefore, it is necessary to control the clutch in consideration of a change in the control pressure. In Patent Literature 1, the change with time of this control pressure is not considered.

The present invention has been made in view of the above-described circumstances and an object thereof is to provide a vehicle control device capable of accurately transmitting necessary torque to driving wheels by a power transmission mechanism interposed between a driving force source and the driving wheels.

Provided is a vehicle control device for a vehicle related to the invention, in which the vehicle has a driving force source, driving wheels, and a power transmission mechanism that is interposed between the driving force source and the driving wheels and controls transmission of a driving force from the driving force source to the driving wheels by using a frictional force. The vehicle control device includes: a transmission torque acquisition unit configured to acquire a first transmission torque transmitted by the power transmission mechanism in a first state in which a control pressure of the power transmission mechanism is controlled to a first pressure value, and a second transmission torque transmitted by the power transmission mechanism in a second state in which the control pressure of the power transmission mechanism is controlled to a second pressure value; a storage unit configured to store control data indicating a relationship between a transmission torque of the power transmission mechanism and a control pressure of the power transmission mechanism required to obtain the transmission torque, the control data including friction coefficient data indicating a relationship between a friction coefficient of the power transmission mechanism and a surface pressure to be applied to a friction material of the power transmission mechanism, which is obtained by subtracting a set value of touch point pressure set as a minimum control pressure of the power transmission mechanism required to start transmission of the torque by the power transmission mechanism from the control pressure of the power transmission mechanism; a controller configured to control the power transmission mechanism based on the control data; and a correction unit configured to correct the control data. And the correction unit is configured to: calculate a first friction coefficient which is a friction coefficient of the power transmission mechanism in the first state based on the friction coefficient data and the first pressure value; calculate a second friction coefficient which is a friction coefficient of the power transmission mechanism in the second state based on the friction coefficient data and the second pressure value; calculate an estimated value of the touch point pressure based on the first pressure value, the first transmission torque, the first friction coefficient, the second pressure value, the second transmission torque, and the second friction coefficient; and correct the control data based on the estimated value.

According to the present invention, it is possible to provide a vehicle control device capable of accurately transmitting necessary torque to driving wheels by a power transmission mechanism interposed between a driving force source and the driving wheels.

DETAILED DESCRIPTION

Hereinafter, an embodiment of the present invention will be described with reference to the drawings.

Figure 1:
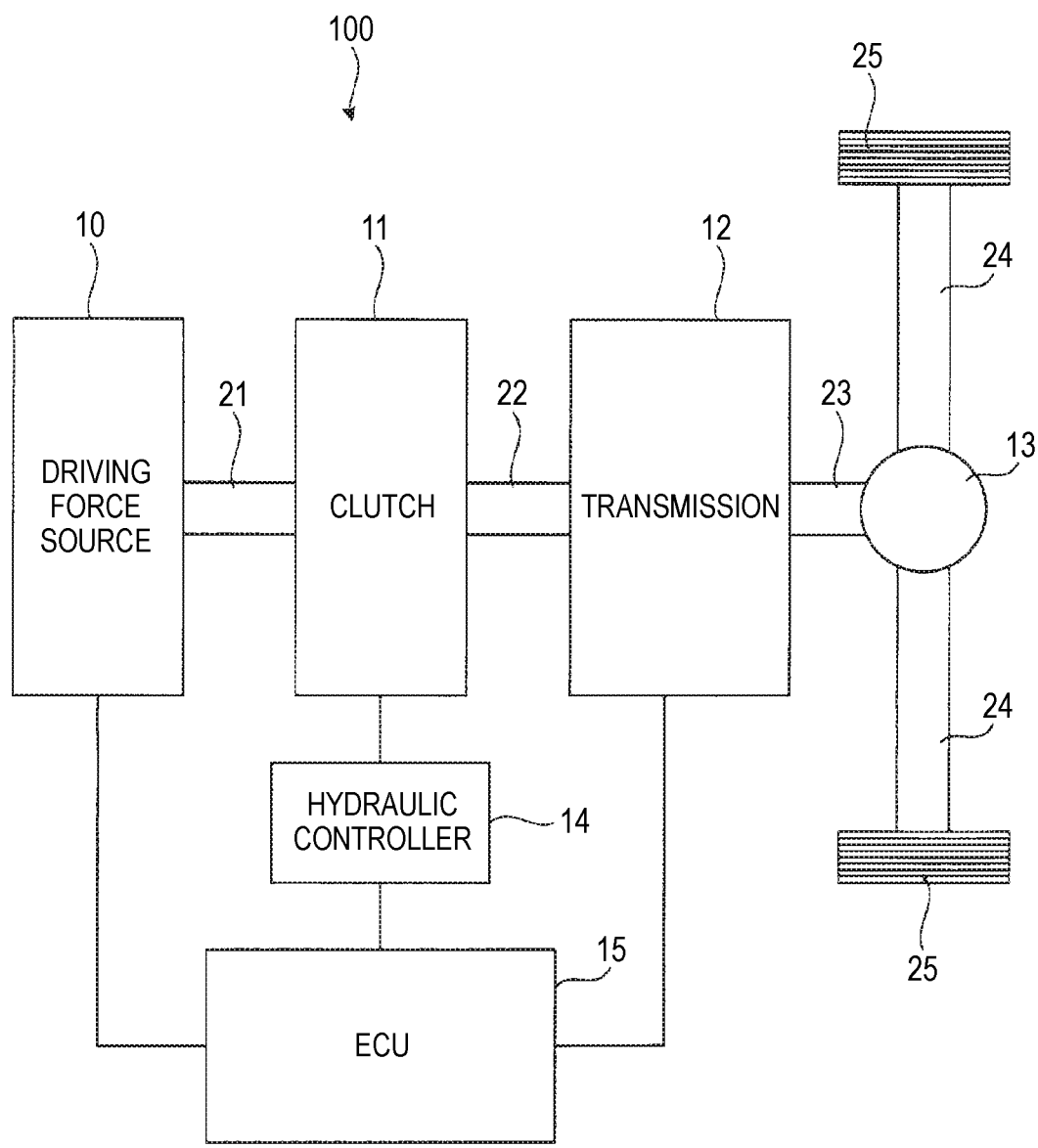
FIG. 1 is a schematic diagram illustrating a schematic configuration of a vehicle controlled by a control device according to an embodiment of the present invention.

FIG. 1 is a schematic diagram illustrating a schematic configuration of a vehicle 100 controlled by a control device according to an embodiment of the present invention.

The vehicle 100 illustrated in FIG. 1 includes a driving force source 10 constituted by an internal combustion engine such as an engine or an electric motor such as a motor, a clutch 11 constituting a power transmission mechanism, a transmission 12, a differential gear 13, a hydraulic controller 14, an electronic controller (ECU) 15, a crankshaft 21 connected to the driving force source 10, an input shaft 22 connecting the clutch 11 and the transmission 12, an output shaft 23 connecting the transmission 12 and the differential gear 13, a pair of drive shafts 24 connected to the differential gear 13, and driving wheels 25 fixed to the respective drive shafts 24.

The clutch 11 is a power transmission mechanism that controls the transmission of the power to be transmitted from the driving force source 10 to the crankshaft 21 to the driving wheels 25 by a frictional force.

The clutch 11 is controlled to be in either a connection state in which the power transmitted to the crankshaft 21 is transmitted to the input shaft 22 and the power is transmitted to the driving wheels 25 via the transmission 12, the output shaft 23, the differential gear 13, and the drive shaft 24, or a cutoff state in which the power transmitted from the driving force source 10 to the crankshaft 21 is cut off.

The clutch 11 is, for example, a multi-plate or single plate wet or dry friction clutch. As the clutch 11, a clutch including a friction material, a piston mechanism for moving the friction material, and a return spring for biasing the piston mechanism in a direction in which the friction member and the member to be contacted separate from each other in order to secure a clearance between the friction material and the member to be contacted (a rotating body which is fixed to the crankshaft 21 and rotates) is used.

In the example of FIG. 1, the clutch 11 is of a hydraulic type driven by a hydraulic actuator. The hydraulic pressure control circuit 14 controls the hydraulic pressure inside the clutch 11 based on a command from the ECU 15, thereby adjusting the control pressure of the clutch 11 (pressure for pressing the piston toward the friction material side).

In a case where the clutch 11 is a multiple disc type and hydraulic type friction clutch, a transmission torque capacitance T of the clutch 11 is expressed by the following Expression (1).

$$T = 2N \times R \times \mu \times (P \times A + F_c - F_{RTN}) \quad (1)$$

2N: number of friction plate surfaces
R: effective radius of friction material
t: friction coefficient
μ: control pressure
A: piston pressure receiving area
$F_c$: oil centrifugal force in clutch
$F_{RTN}$: return spring operation weight As seen from Expression (1), when a predetermined control pressure is applied to the clutch 11, the pressure obtained by subtracting the biasing force of the return spring (however, a value obtained by subtracting an amount cancelled by the oil centrifugal force) from this control pressure is applied to the friction material of the clutch 11. The pressure applied to this friction material is hereinafter also referred to as the surface pressure of the friction material.

The control pressure P when (P×A) and ($F_c - F_{RTN}$) in Expression (1) coincide with each other is the minimum control pressure required to start the transmission of torque by the clutch 11 (hereinafter, referred to as touch point pressure). This touch point pressure is a value that can be changed by a secular change of the return spring. In addition, the friction coefficient μ of the friction material is a value that can be changed by a secular change of the friction material.

The ECU 15 generally controls various hardware of the vehicle 100 including the driving force source 10, the hydraulic controller 14, and the transmission 12. A control device of the vehicle 100 is constituted by the ECU 15.

The ECU 15 includes various processors that perform processes by executing programs, a random access memory (RAM), and a read only memory (ROM) that constitutes a storage unit.

The above-mentioned various processors include dedicated electric circuits which are processors having a circuit configuration exclusively designed for executing a specific process, such as a programmable logic device (PLD), an application specific integrated circuit (ASIC), or the like, as processors of which the circuit configuration is changeable after a central processing unit (CPU), field programmable gate array (FPGA), and the like, which are general-purpose processors that perform various processes by executing programs, are manufactured, and the like.

More specifically, the structures of these various processors are electric circuits combining circuit elements such as a semiconductor element.

In the ROM of the ECU 15, control data indicating a relationship between a transmission torque T(P) of the clutch 11 and a control pressure P of the clutch 11 required to obtain the transmission torque is stored in advance. The control data is stored as, for example, the following Expression (2).

$$T(P) = 2N \times R \times \{\mu_D(P - P_{D0})\}(P - P_{D0}) \times A \quad (2)$$

In Expression (2), 2N represents the number of friction plate surfaces, P represents control pressure, and A represents a piston pressure receiving surface. 2N, R, and A are respectively stored in the ROM in advance as characteristic values indicating the structure of the clutch 11.

Further, in Expression (2), $\mu_D(P - P_{D0})$ is friction coefficient data in which the friction coefficient of the friction material of the clutch 11 is expressed as a function of surface pressure (a value obtained by subtracting the touch point pressure from the control pressure). $P_{D0}$ in Expression (2) represents the above-mentioned touch point pressure and is stored in the ROM as a set value determined at the time of manufacturing of the clutch 11.

Figure 2:
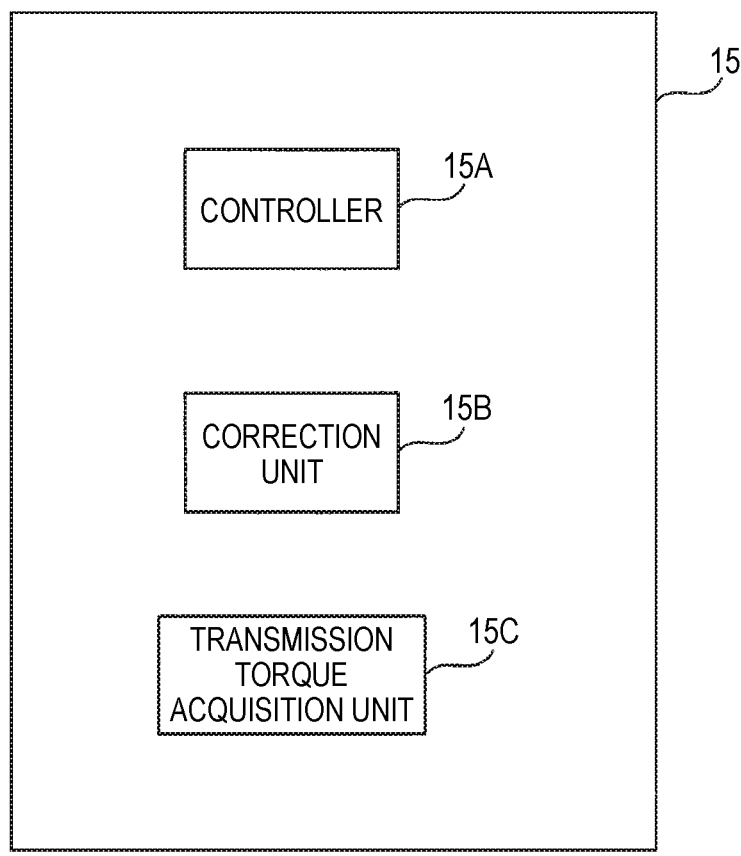
FIG. 2 is a diagram illustrating a functional block of an ECU illustrated in FIG. 1.

FIG. 2 is a diagram illustrating a functional block of the ECU 15 illustrated in FIG. 1. The processor of the ECU 15 executes a program and cooperates with the hardware to function as a controller 15A, a correction unit 15B, and a transmission torque acquisition unit 15C.

The controller 15A controls the clutch 11 based on the control data stored in the ROM. Specifically, when the target transmission torque of the clutch 11 is determined, the controller 15A obtains the control pressure P (instruction value) required to obtain the target transmission torque from Expression (2). Then, the hydraulic pressure control circuit 14 is controlled to adjust the hydraulic pressure of the clutch 11 so that the control pressure of the clutch 11 becomes the obtained instruction value.

The correction unit 15B corrects the control data stored in the ROM (specifically, the correction in consideration of the secular change of the touch point pressure of the clutch 11 and the secular change of the friction coefficient of the friction material) at a predetermined timing. This timing is set to, for example, a predetermined periodic timing (for example, at the timing every time the travel distance of the vehicle 100 increases by a predetermined amount).

The transmission torque acquisition unit 15C acquires transmission torque transmitted by the clutch 11 in a state in which the control pressure of the clutch 11 is controlled to a value large enough to allow torque transmission by the clutch 11.

For example, the a torque sensor that directly measures the torque generated by an engine as the driving force source 10 is provided in the vehicle 100, and the transmission torque acquisition unit 15C acquires the torque measured by the torque sensor as the transmission torque. Alternatively, the transmission torque acquisition unit 15C estimates the engine torque based on the throttle valve opening degree of the engine and the engine rotation speed, and acquires an estimated value of the engine torque as the transmission torque. Alternatively, a torque sensor that directly measures the torque of the input shaft 22 is provided in the vehicle 10X), and the transmission torque acquisition unit 15C acquires the torque measured by the torque sensor as the transmission torque.

Figure 3:
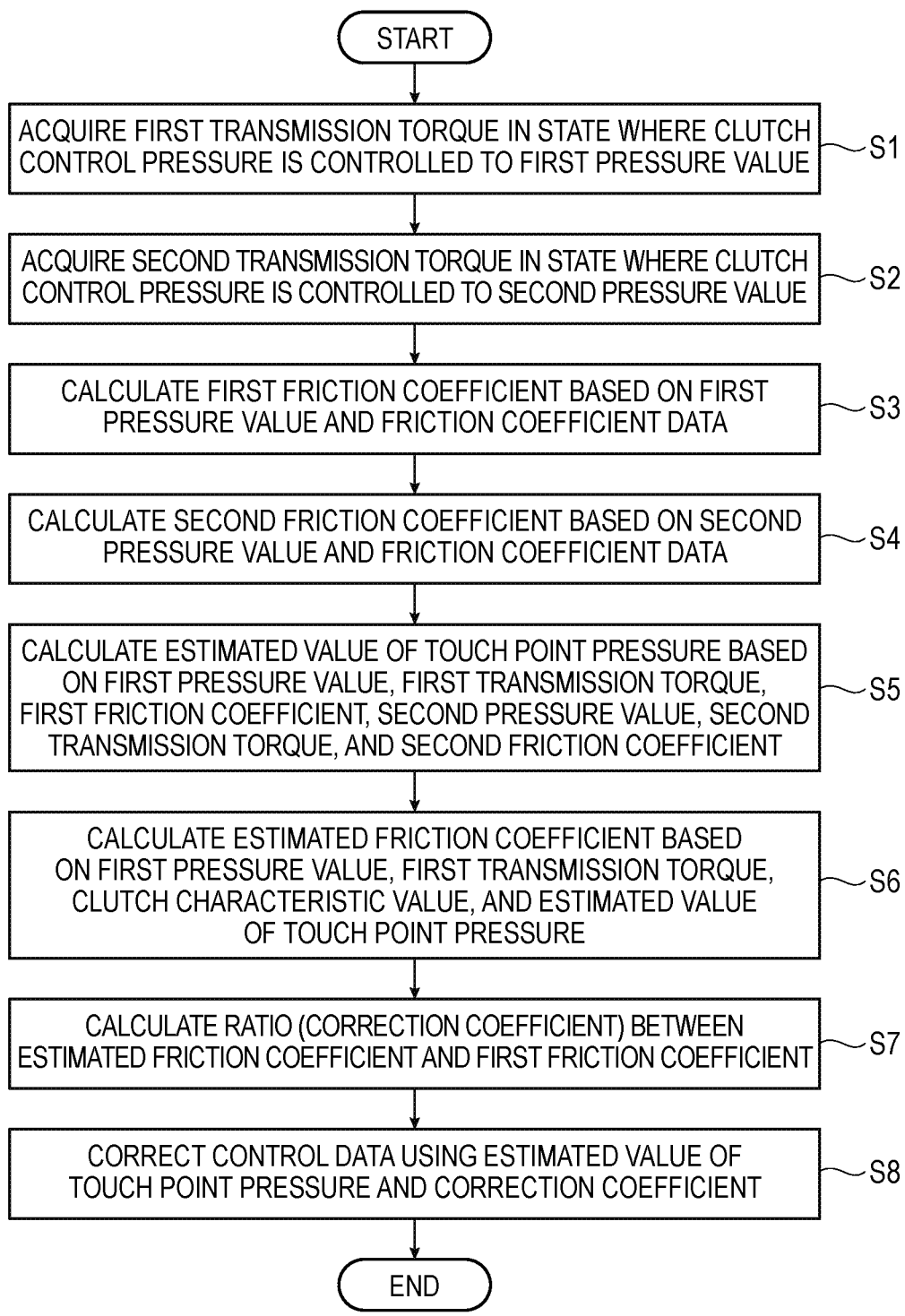
FIG. 3 is a flowchart for explaining a correction operation of control data by a correction unit illustrated in FIG. 2.

FIG. 3 is a flowchart for explaining a correction operation of control data by the correction unit 15B illustrated in FIG. 2.

At the above timing, the correction unit 15B instructs the hydraulic pressure control circuit 14 to control the control pressure of the clutch 11 to a predetermined first pressure value $P_1$ (a value large enough to allow torque transmission by the clutch 11). Then, the transmission torque acquisition unit 15C acquires the transmission torque transmitted by the clutch 11 in a first state in which the control pressure of the clutch 11 is controlled to the first pressure value $P_1$ (Step S1). The transmission torque acquired here is taken as a first transmission torque $T_{R1}$.

After Step S1, the correction unit 15B instructs the hydraulic pressure control circuit 14 to control the control pressure of the clutch 11 to a predetermined second pressure value $P_2$ (a value larger than the first pressure value). The transmission torque acquisition unit 15C acquires the transmission torque transmitted by the clutch 11 in a second state in which the control pressure of the clutch 11 is controlled to the second pressure value $P_2$ (Step S2). The transmission torque acquired here is taken as a second transmission torque $T_{R2}$.

Next, the correction unit 15B calculates a first friction coefficient (hereinafter, also referred to as a design friction coefficient $\mu_{D1}$) of the clutch 11 in the first state based on the first pressure value $P_1$ set in Step S1 and the friction coefficient data "$\mu_D(P-P_{D0})$" in Expression (2) out of the control data stored in the ROM (Step S3).

Specifically, the correction unit 15B substitutes the first pressure value $P_1$ for "P" of "$\mu_D(P-P_{D0})$" to obtain the design friction coefficient $\mu_{D1}$.

In addition, the correction unit 15B calculates a second friction coefficient (hereinafter, also referred to as a design friction coefficient $\mu_{D2}$) of the clutch 11 in the second state based on the second pressure value $P_2$ set in Step S2 and the friction coefficient data stored in the ROM (Step S4).

Specifically, the correction unit 15B substitutes the second pressure value P2 for "P" of "$\mu_D(P-P_{D0})$" to obtain the design friction coefficient $\mu_{D2}$.

Next, the correction unit 15B calculates an estimated value of touch point pressure of the clutch 11 based on the first pressure value $P_1$ set in Step S1, the first transmission torque $T_{R1}$ obtained in Step S1, the design friction coefficient $\mu_{D1}$ calculated in Step S3, the second pressure value $P_2$ set in Step S2, the second transmission torque $T_{R2}$ obtained in Step S2, and the design friction coefficient $\mu_{D2}$ calculated in Step S4 (Step S5).

Specifically, the correction unit 15B calculates an estimated touch point pressure $P_{E0}$ by performing operation of the following Expression (3).

$$P_{E0} = \frac{P_1 \times T_{R2} \times \mu_{D1} - P_2 \times T_{R1} \times \mu_{D2}}{T_{R2} \times \mu_{D1} - T_{R1} \times \mu_{D2}} \quad (3)$$

This Expression (3) is determined based on the following idea.

The design friction coefficient $\mu_{D1}$ calculated in Step S3 is a design value in the first state in which the control pressure of the clutch 11 is controlled to the first pressure value $P_1$. As described above, actually, due to the secular change of the clutch 11, the friction coefficient in the first state is deviated from the design friction coefficient $\mu_{D1}$.

The first transmission torque $T_{R1}$ in the first state is a value obtained by substituting the first pressure value $P_1$ for "P" in Expression (2), and further changing "$P_{D0}$" in Expression (2) to "$P_{E0}$" as an unknown number to be estimated. Accordingly, an estimated friction coefficient $\mu_{E1}$ in the first state can be obtained as the following first operation Expression (4) including the unknown number "$P_{E0}$".

$$\mu_{E1} = \frac{T_{R1}}{2N \times R \times (P_1 - P_{E0}) \times A} \quad (4)$$

Similarly, the design friction coefficient $\mu_{D2}$ calculated in Step S4 is a design value in the second state in which the control pressure of the clutch 11 is controlled to the second pressure value $P_2$. Actually, due to the secular change of the clutch 11, the friction coefficient in the second state is deviated from the design friction coefficient $\mu_{D2}$.

The second transmission torque $T_{R2}$ in the second state is a value obtained by substituting the second pressure value $P_2$ for "P" in Expression (2), and further changing "$P_{D0}$" in Expression (2) to "$P_{E0}$" as an unknown number to be estimated. Accordingly, an estimated friction coefficient $\mu_{E2}$ in the second state can be obtained as the following second operation Expression (5) including the unknown number "$P_{E0}$".

$$\mu_{E2} = \frac{T_{R2}}{2N \times R \times (P_2 - P_{E0}) \times A} \quad (5)$$

Assuming that a ratio ($=\mu_{E1}/\mu_{D1}$) between the design friction coefficient $\mu_{D1}$ and the estimated friction coefficient μE is Gain_$\mu_1$, and a ratio ($=\mu_{E2}/\mu_{D2}$) between the design friction coefficient $\mu_{D2}$ and the estimated friction coefficient $\mu_{E2}$ is Gain_$\mu_2$, even when the control pressure of the clutch 11 is different, the changes of the touch point pressure and the friction coefficient of the clutch 11 are the same, and thus it can be considered that Gain_$\mu_1$ and Gain_$\mu_2$ coincide with each other.

Gain_$\mu_1$=Gain_$\mu_2$ is set and the expression obtained by solving this expression for the unknown number $P_{E0}$ is the above Expression (3).

After the estimated touch point pressure $P_{E0}$ is calculated in Step S5, the correction unit 15B substitutes the estimated touch point pressure $P_{E0}$ into the above Expression (4) to calculate the estimated friction coefficient $\mu_{E1}$ (Step S6).

The correcting unit 15B may calculate the estimated friction coefficient $\mu_{E2}$ by substituting the estimated touch point pressure $P_{E0}$ into the above Expression (5).

Next, the correction unit 15B calculates the ratio ($=\mu_{E1}/\mu_{D1}$) between the design friction coefficient $\mu_{D1}$ calculated in Step S3 and the estimated friction coefficient $\mu_{E1}$ calculated in Step S6 as the correction coefficient Gain-μ of the friction coefficient data (Step S7).

When the estimated friction coefficient $\mu_{E2}$ is calculated in Step S6, the correction unit 15B may calculate the ratio ($=\mu_{E2}/\mu_{D2}$) between the design friction coefficient $\mu_{D2}$ calculated in Step S4 and the estimated friction coefficient $\mu_{E2}$ in Step S7 as the coefficient Gain_μ.

The correction unit 15B corrects the control data stored in the ROM by using the estimated touch point pressure PE and the correction coefficient Gain_μ calculated in this manner (Step S8).

Specifically, the correcting unit 15B corrects the friction coefficient data by multiplying the friction coefficient data $\{\mu_D(P-P_{D0})\}$ of Expression (2) by the correction coefficient Gain_μ. Further, the correction unit 15B changes the touch point pressure $P_{D0}$ of Expression (2) to the estimated touch point pressure $P_{E0}$. The control data corrected in this manner is expressed by the following Expression (6).

$$T(P)=2N \times R \times \{\mu_D(P-P_{E0})\} \times \text{Gain\_}\mu \times (P-P_{E0}) \times A \quad (6)$$

After the control data is corrected by the correction unit 15B, the controller 15A controls the clutch 11 based on this control data.

As described above, according to the ECU 15 of the vehicle 100, it is possible to estimate the secular change of the touch point pressure of the clutch 11 and correct the control data based on the estimated touch point pressure. Therefore, the control data can be corrected with high precision and even when the vehicle 100 is in use for a long time, the required torque can be accurately transmitted to the driving wheels 25 by the clutch 11.

Also, the information necessary for calculating the estimated touch point pressure is only the torque transmitted by the clutch 11 in the first state and the second state. As described above, since the process related to the calculation of the estimated touch point pressure is simple, it is possible to correctly correct the control data of the clutch 11 without increasing the manufacturing cost of the vehicle 100.

In the example of FIG. 1, the clutch 11 is a hydraulically driven type driven by a hydraulic actuator, but is not limited thereto. For example, the piston mechanism may be driven by motor driving.

In addition, the power transmission mechanism to be controlled by the control device of the present invention is not limited to one that switches the connection state and the cutoff state like the clutch 11, but also applies to a lockup clutch used for a torque converter or the like.

As described above, the following items are disclosed in the specification.

(1) A vehicle control device (for example, the ECU 15 in the above-mentioned embodiment) for a vehicle, in which
the vehicle has a driving force source (for example, the driving force source 10 in the above-mentioned embodiment), driving wheels (for example, the driving wheels 25 in the above-mentioned embodiment), and a power transmission mechanism (for example, the clutch 11 in the above-mentioned embodiment) that is interposed between the driving force source and the driving wheels and controls transmission of a driving force from the driving force source to the driving wheels by using a frictional force, and the vehicle control device includes:
  a transmission torque acquisition unit (for example, the transmission torque acquisition unit 15C in the above-mentioned embodiment) configured to acquire a first transmission torque transmitted by the power transmission mechanism in a first state in which a control pressure of the power transmission mechanism is controlled to a first pressure value, and a second transmission torque transmitted by the power transmission mechanism in a second state in which the control pressure of the power transmission mechanism is controlled to a second pressure value;
  a storage unit (for example, the ROM of the ECU 15 in the above-mentioned embodiment) configured to store control data (Expression (2) in the above-mentioned embodiment) indicating a relationship between a transmission torque of the power transmission mechanism and a control pressure of the power transmission mechanism required to obtain the transmission torque, the control data including friction coefficient data (for example, $\mu_D(P-P_{D0})$ in Expression (2) in the above-mentioned embodiment) indicating a relationship between a friction coefficient of the power transmission mechanism and a surface pressure to be applied to a friction material of the power transmission mechanism, which is obtained by subtracting a set value of touch point pressure set as a minimum control pressure of the power transmission mechanism required to start transmission of the torque by the power transmission mechanism from the control pressure of the power transmission mechanism;
  a controller (for example, the controller 15A in the above-mentioned embodiment) configured to control the power transmission mechanism based on the control data; and
  a correction unit (for example, the correction unit 15B in the above-mentioned embodiment) is configured to correct the control data, and the correction unit is configured to:
  calculate a first friction coefficient which is a friction coefficient of the power transmission mechanism in the first state based on the friction coefficient data and the first pressure value;
  calculate a second friction coefficient which is a friction coefficient of the power transmission mechanism in the second state based on the friction coefficient data and the second pressure value;
  calculate an estimated value of the touch point pressure based on the first pressure value, the first transmission torque, the first friction coefficient, the second pressure value, the second transmission torque, and the second friction coefficient; and
  correct the control data based on the estimated value.

According to (1), the touch point pressure can be estimated based on the first pressure value, the first transmission torque, the first friction coefficient, the second pressure value, the second transmission torque, and the second friction coefficient obtained in the first state and the second state. Therefore, it is possible to accurately correct the control data by using this estimated value and to prevent deviation of the transmission torque from an instruction torque.

(2) The vehicle control device according to (1), in which
  a plurality of characteristic values (for example, 2N, R. and A in the above-mentioned embodiment) indicating a structure of the power transmission mechanism are stored in the storage unit,
  the correction unit is configured to calculate the estimated value by operation of substituting the first pressure value, the first transmission torque, the first friction coefficient, the second pressure value, the second transmission torque, and the second friction coefficient into a derivation expression for an unknown number obtained in a case where a first ration coincides with a second ratio,
  the first ratio is a ratio between the first friction coefficient and a first operation expression for the friction coefficient of the power transmission mechanism in the first state, the first operation expression being determined based on the unknown number of the touch point pressure, the first pressure value, the first transmission torque, and the plurality of characteristic values, and
  the second ratio is a ratio between the second friction coefficient and a second operation expression for the friction coefficient of the power transmission mechanism in the second state, the second operation expression being determined based on the unknown number of the touch point pressure, the second pressure value, the second transmission torque, and the plurality of characteristic values.

Since the secular change of the friction coefficient of the friction material and the touch point pressure are considered to be constant regardless of the surface pressure, by treating the first ratio and the second ratio as the same value, the derivation expression for estimating the touch point pressure is obtained as in the above configuration from the first ratio and the second ratio. Therefore, it is possible to calculate the estimated value of the touch point pressure from this derivation expression.

(3) The vehicle control device according to (1), wherein the estimated value is calculated by operation of $$P_{E0} = \frac{P_1 \times T_{R2} \times \mu_{D1} - P_2 \times T_{R1} \times \mu_{D2}}{T_{R2} \times \mu_{D1} - T_{R1} \times \mu_{D2}},$$

where $P_1$ is the first pressure value, $P_2$ is the second pressure value, $T_{R1}$ is the first transmission torque, $T_{R2}$ is the second transmission torque, $\mu_{D1}$ is the first friction coefficient, $\mu_{D2}$ is the second friction coefficient. $P_{E0}$ is the estimated value, and the first pressure value is set to be smaller than the second pressure value.

According to (3), the estimated value of the touch point pressure can be calculated merely by obtaining two transmission torque values by changing the control pressure and thus it is possible to easily and accurately correct the control data.

(4) The vehicle control device according to any one of (1) to (3), in which the correction unit is configured to: calculate an estimated friction coefficient of the power transmission mechanism in the first state based on the first pressure value, the first transmission torque, the plurality of characteristic values indicating the structure of the power transmission mechanism, and the estimated value, calculate a ratio between the first friction coefficient and the estimated friction coefficient as a correction coefficient; and multiply friction coefficient data by the correction coefficient to correct the friction coefficient data.

According to (4), the friction coefficient data can be corrected using the estimated value of the touch point pressure. Therefore, it is possible to correctly correct the control data.

(5) The vehicle control device according to any one of (1) to (4), in which the control data is expressed as a product of the friction coefficient data, the plurality of characteristic values indicating the structure of the power transmission mechanism, and the surface pressure, which is obtained by subtracting the set value of the touch point pressure from the control pressure of the power transmission mechanism and is applied to the friction material, and the correction unit is configured to change the set value of the touch point pressure in the control data to the estimated value to correct the control data.

According to (5), since the touch point pressure in the control data is corrected, it is possible to correctly correct the control data.

(6) The vehicle control device according to any one of (1) to (5), in which the controller is configured to:

calculate an indication value of a control pressure of the power transmission mechanism required to obtain a target transmission torque based on the target transmission torque and the control data; and control the control pressure of the power transmission mechanism to the indication value.

According to (6), it is possible to accurately determine the control pressure at which the target transmission torque can be obtained.

What is claimed is:
1. A vehicle control device for a vehicle, wherein
the vehicle has a driving force source, driving wheels, and a power transmission mechanism that is interposed between the driving force source and the driving wheels and controls transmission of a driving force from the driving force source to the driving wheels by using a frictional force, and
the vehicle control device comprises:
a transmission torque acquisition unit configured to acquire a first transmission torque transmitted by the power transmission mechanism in a first state in which a control pressure of the power transmission mechanism is controlled to a first pressure value, and a second transmission torque transmitted by the power transmission mechanism in a second state in which the control pressure of the power transmission mechanism is controlled to a second pressure value;
a storage unit configured to store control data indicating a relationship between a transmission torque of the power transmission mechanism and a control pressure of the power transmission mechanism required to obtain the transmission torque, the control data including friction coefficient data indicating a relationship between a friction coefficient of the power transmission mechanism and a surface pressure to be applied to a friction material of the power transmission mechanism, the surface pressure to be applied is obtained by subtracting a set value of touch point pressure set as a minimum control pressure of the power transmission mechanism required to start transmission of the torque by the power transmission mechanism from the control pressure of the power transmission mechanism;
a controller configured to control the power transmission mechanism based on the control data; and
a correction unit configured to correct the control data, and
the correction unit is configured to:
calculate a first friction coefficient which is a friction coefficient of the power transmission mechanism in the first state based on the friction coefficient data and the first pressure value;
calculate a second friction coefficient which is a friction coefficient of the power transmission mechanism in the second state based on the friction coefficient data and the second pressure value;
calculate an estimated value of the touch point pressure based on the first pressure value, the first transmission torque, the first friction coefficient, the second pressure value, the second transmission torque, and the second friction coefficient; and
correct the control data based on the estimated value.

2. The vehicle control device according to claim 1, wherein
a plurality of characteristic values indicating a structure of the power transmission mechanism are stored in the storage unit,
the correction unit is configured to calculate the estimated value by operation of substituting the first pressure value, the first transmission torque, the first friction coefficient, the second pressure value, the second transmission torque, and the second friction coefficient into a derivation expression for an unknown number obtained in a case where a first ration coincides with a second ratio, the first ratio is a ratio between the first friction coefficient and a first operation expression for the friction coefficient of the power transmission mechanism in the first state, the first operation expression being determined based on the unknown number of the touch point pressure, the first pressure value, the first transmission torque, and the plurality of characteristic values, and the second ratio is a ratio between the second friction coefficient and a second operation expression for the friction coefficient of the power transmission mechanism in the second state, the second operation expression being determined based on the unknown number of the touch point pressure, the second pressure value, the second transmission torque, and the plurality of characteristic values.

3. The vehicle control device according to claim 1, wherein
the estimated value is calculated by operation of $$P_{E0} = \frac{P_1 \times T_{R2} \times \mu_{D1} - P_2 \times T_{R1} \times \mu_{D2}}{T_{R2} \times \mu_{D1} - T_{R1} \times \mu_{D2}},$$

where $P_1$ is the first pressure value, $P_2$ is the second pressure value, $T_{R1}$ is the first transmission torque, $T_{R2}$ is the second transmission torque, $\mu_{D1}$ is the first friction coefficient, $\mu_{D2}$ is the second friction coefficient, $P_{E0}$ is the estimated value, and the first pressure value is set to be smaller than the second pressure value.

4. The vehicle control device according to claim 1, wherein the correction unit is configured to:
calculate an estimated friction coefficient of the power transmission mechanism in the first state based on the first pressure value, the first transmission torque, the plurality of characteristic values indicating the structure of the power transmission mechanism, and the estimated value;
calculate a ratio between the first friction coefficient and the estimated friction coefficient as a correction coefficient; and
multiply friction coefficient data by the correction coefficient to correct the friction coefficient data.

5. The vehicle control device according to claim 1, wherein
the control data is expressed as a product of the friction coefficient data, the plurality of characteristic values indicating the structure of the power transmission mechanism, and the surface pressure, which is obtained by subtracting the set value of the touch point pressure from the control pressure of the power transmission mechanism and is applied to the friction material, and
the correction unit is configured to change the set value of the touch point pressure in the control data to the estimated value to correct the control data.

6. The vehicle control device according to claim 1, wherein the controller is configured to:
calculate an indication value of a control pressure of the power transmission mechanism required to obtain a target transmission torque based on the target transmission torque and the control data; and
control the control pressure of the power transmission mechanism to the indication value.

* * * * *